United States Patent
Dong et al.

(10) Patent No.: US 9,736,116 B2
(45) Date of Patent: Aug. 15, 2017

(54) COOPERATED APPROACH TO NETWORK PACKET FILTERING

(71) Applicant: Intel Corporation, Santa Clara, CA (US)

(72) Inventors: Yaozu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/057,176

(22) Filed: Mar. 1, 2016

(65) Prior Publication Data

US 2016/0285830 A1    Sep. 29, 2016

Related U.S. Application Data

(63) Continuation of application No. 13/882,106, filed on Jul. 28, 2014, now Pat. No. 9,276,875.

(51) Int. Cl.
*G06F 13/00* (2006.01)
*H04L 29/06* (2006.01)
*H04L 12/931* (2013.01)
*G06F 9/455* (2006.01)

(52) U.S. Cl.
CPC ...... *H04L 63/0263* (2013.01); *G06F 9/45558* (2013.01); *H04L 49/00* (2013.01); *H04L 63/0245* (2013.01); *G06F 2009/45595* (2013.01)

(58) Field of Classification Search
CPC ..... G06F 9/4862; G06F 9/45533; H04L 45/00
USPC .............................. 719/317; 718/1; 709/238
See application file for complete search history.

(56) References Cited

U.S. PATENT DOCUMENTS

| | | | |
|---|---|---|---|
| 8,032,660 B2 * | 10/2011 | Sahita | G06F 9/45558 370/252 |
| 8,370,834 B2 * | 2/2013 | Edwards | G06F 9/5077 709/238 |
| 2011/0307716 A1 * | 12/2011 | Diab | H04L 12/12 713/300 |

* cited by examiner

*Primary Examiner* — Andy Ho
(74) *Attorney, Agent, or Firm* — Barnes & Thornburg LLP

(57) ABSTRACT

An apparatus, system, method, and machine-readable medium are disclosed. In one embodiment the apparatus is a network interface controller that includes one virtual function owned by a virtual machine present in the computer system. The controller includes a simple filtering agent that is associated with the first virtual function. The agent enforces simple filter rules for received network packets. The simple filter rules are capable of blocking the network packets from reaching the virtual machine. The apparatus also includes another virtual function that is owned by a virtual machine monitor present in the computer system. The controller also includes a side bounce filtering agent to forward the first network packet to the second virtual function if the first packet is blocked by the at least one of the one or more simple filter rules.

28 Claims, 6 Drawing Sheets

COOPERATED APPROACH TO NETWORK PACKET FILTERING

CROSS-REFERENCE TO RELATED APPLICATION

The present application is a continuation application of U.S. application Ser. No. 13/882,106, entitled "COOPERATED APPROACH TO NETWORK PACKET FILTERING," which was filed on Jul. 28, 2014 and was issued as U.S. Pat. No. 9,276,875 on Mar. 1, 2016.

FIELD OF THE INVENTION

The invention relates to network packet filtering.

BACKGROUND OF THE INVENTION

Network virtualization is an important area in data center virtualization and cloud computing. Research in this area has been focusing on performance. Recently, more concerns are placed on the homogeneity between virtual network facilities and existing physical network facilities. Fine-grained control on virtual network is desired. Fine-grained control includes packet filtering. But the more control over packet filtering comes with a price, performance starts to decline with complex packet filtering rules. This is especially true in the cloud computing area. Adoption of public cloud computing services is hampered by a concern with the security of cloud architecture. Cloud service providers seek to have acceptable network protection in their cloud infrastructure. However security dealing with packet filtering generally provides a rich packet filtering capability with compromised performance, or a weak packet filtering capability with ensured high performance.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Elements of an apparatus, system, method, and machine-readable medium to implement cooperated packet filtering are disclosed.

In general, a packet filtering approach is disclosed that utilizes bifurcated filters in cooperation with each other. A network interface controller includes several virtual functions that are owned by several virtual machines running on a computer system. Each virtual function includes a simple filtering agent that can enforce simple filtering rules (i.e., first level filtering) on incoming and outgoing network packets. These simple filtering rules utilize the network packet header for enforcement. If a straightforward filtering approach is sufficient through simple filtering rules, the packet may either pass or be blocked outright by the simple filtering agent with negligible performance impact. In other situations, certain incoming and outgoing packets do not lend themselves to a simple set of filtering rules and require complex filtering. In these cases the simple filtering agent will forward these packets on to a sideband filtering agent that can then reroute/forward these packets to a virtual Ethernet bridge, which is normally a software component in a virtual machine monitor, for complex filtering (i.e., a second level filtering). Thus, the critical performance path utilizes a set of simple filter rules to attempt to enforce filtering at the first level and minimally disrupt network performance (i.e., minimal increased latency on these packets). Packets that can't be filtered in a simple manner are brought out of the critical performance path into the sideband path for complex filtering. Thus, creating a streamlined network packet filtering experience using the simple and complex bifurcated filtering approach.

Figure 1:
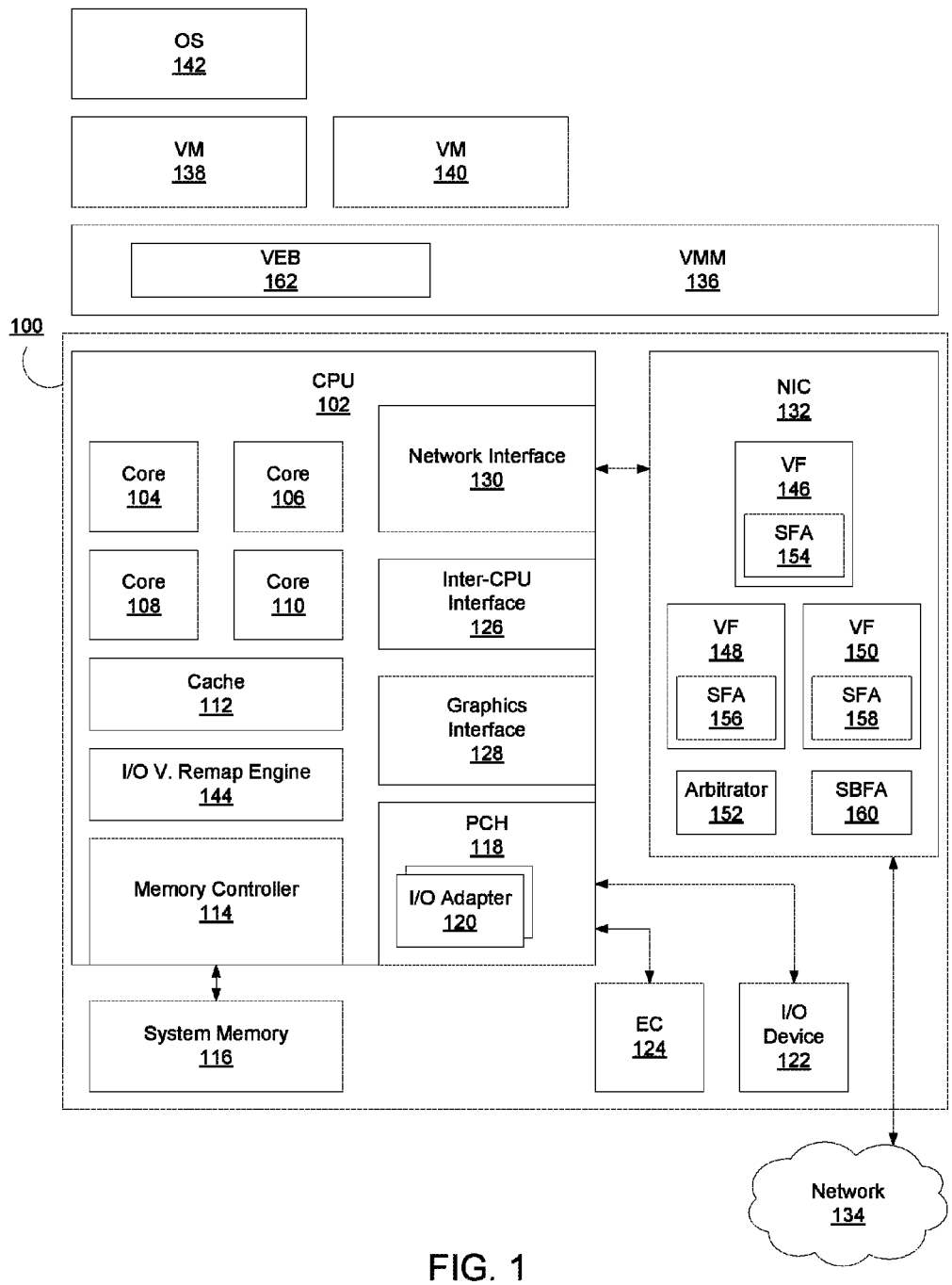
FIG. 1 illustrates an embodiment of a computer system capable of cooperated packet filtering.

FIG. 1 illustrates an embodiment of a computer system capable of cooperated packet filtering.

Computer system 100 is shown. The computer system may be a desktop, server, workstation, laptop, handheld, television set-top, media center, game console, integrated system (such as in a car), or other type of computer system. In several embodiments the computer system 100 includes one or more central processing units (CPUs), also referred to as "processors." Although in many embodiments there are potentially many CPUs, in the embodiment shown in FIG. 1 only CPU 102 is shown for clarity. CPU 102 may be an Intel® Corporation CPU or a CPU of another brand. CPU 102 includes one or more cores in different embodiments. CPU 102 is shown including four cores (Cores 104, 106, 108, and 110).

In many embodiments, each core includes internal functional blocks such as one or more execution units, retirement units, a set of general purpose and specific registers, etc. In a single-threaded core, each core may be referred to as a hardware thread. When a core is multi-threaded or hyper-threaded, then each thread operating within each core may also be referred to as a hardware thread. Thus, any single thread of execution running in the computer system 100 may be referred to as a hardware thread. For example, in FIG. 1, if each core is single-threaded, then there are four hardware threads present in the system (four cores). On the other hand, if each core is multi-threaded and has the capability of maintaining the states of two threads simultaneously, then there are eight hardware threads present in the system (four cores with two threads per core).

CPU 102 may also include one or more caches, such as cache 112. In many embodiments that are not shown, additional caches other than cache 112 are implemented so that multiple levels of cache exist between the execution units in each core and memory. In different embodiments cache 112 may be apportioned in different ways. Additionally, cache 112 may be one of many different sizes in different embodiments. For example, cache 112 may be an 8 megabyte (MB) cache, a 16 MB cache, etc. Additionally, in different embodiments the cache may be a direct mapped cache, a fully associative cache, a multi-way set-associative cache, or a cache with another type of mapping. In many embodiments, cache 112 may include one large portion shared among all cores or may be divided into several separately functional slices (e.g., one slice for each core). Cache 112 may also include one portion shared among all cores and several other portions that are separate functional slices per core.

In many embodiments, CPU 102 includes an integrated system memory controller 114 to provide an interface to communicate with system memory 116. In other embodiments that are not shown, memory controller 114 may be located in a discrete component, separate from CPU 102, elsewhere in computer system 100.

System memory 116 may comprise dynamic random access memory (DRAM), such as a type of double data rate (DDR) DRAM, non-volatile memory such as flash memory, phase change memory (PCM), or another type of memory technology. System memory 116 may be a general purpose memory to store data and instructions to be operated upon by CPU 102. Additionally, there may be other potential devices within computer system 100 that have the capability to read and write to the system memories, such as a direct memory access (DMA)-capable I/O (input/output) device.

The link (i.e., bus, interconnect, etc.) that couples CPU 102 with system memory 116 may include one or more optical, metal, or other wires (i.e. lines) that are capable of transporting data, address, control, and clock information.

Platform controller hub (PCH) 118 (e.g., a complex of I/O controller circuitry) includes an I/O interface that enables communication between the CPU 102 and external I/O devices. The hub may include one or more I/O adapters, such as I/O adapter 120. I/O adapters translate a host communication protocol utilized within the CPU 102 to a protocol compatible with a particular I/O device, such as I/O device 122. Some of the protocols that a given I/O adapter may translate include a Peripheral Component Interconnect (PCI), Universal Serial Bus (USB), IDE, SCSI, and 1394 "Firewire," among others. Additionally, there may be one or more wireless protocol I/O adapters. Examples of wireless protocols are Bluetooth, IEEE 802.11-based wireless protocols, and cellular protocols, among others.

Apart from I/O devices, the PCH 118 also may be coupled to one or more embedded controllers (ECs) in the system, such as EC 124. EC 124 may incorporate a number of functions. For example, a RAID storage controller device may be present within computer system 100. The RAID controller may manage an array of hard disk drives or solid state disks (SSDs). Other examples of the controller device may be a discrete out-of-band manageability engine, a keyboard controller, or another type of controller.

In other embodiments, PCH 118 is a discrete device located externally to the CPU 102. In these embodiments, an interface such as a direct memory interface (DMI) couples the CPU to the PCH. Though, these embodiments are not shown.

Inter-CPU interface 126 may provide an interface to a link coupled to one or more additional CPUs and allow inter-CPU communications to take place. E.g., Inter-CPU high-speed interface may be a quick path interconnect (QPI) or other similar interface. Although additional CPUs are not shown in FIG. 1, in many embodiments that are not shown, CPU 102 is one of multiple CPUs present within computer system 100. In many embodiments, Inter-CPU interface 126 provides a point-to-point high-speed communication interface between CPU 102 and each of the other CPUs present in the system.

Graphics interface 128 may provide an interface to a link coupled to a discrete graphics controller (a discrete graphics controller is not shown). The interface may be a high-speed platform component interconnect (PCI)-Express interface or another high-speed interface. In other embodiments, CPU 102 includes an integrated graphics controller and graphics interface 128 may be coupled to a display device, such as a monitor. In many embodiments, the interface is high-speed to allow for significant graphical data traffic to be transferred across the link (e.g., 3D graphics, video, etc.).

Network interface 130 may provide an interface to a discrete network interface controller (NIC) 132. In different embodiments, the NIC 132 couples the computer system 100 to a network 134 through a wired connection (e.g., Ethernet, etc.) or a wireless connection (e.g., an IEEE 802.11 wireless standard, WiMAX, etc.). The network may be an intranet (such as a network behind a firewall within a business), it may be the Internet, or any other type of network configuration. In other embodiments that are not shown, the NIC 132 may be coupled to the CPU 102 through PCH 118. The interface with which the NIC 132 communicates to the CPU 102 is implementation specific and may depend upon the required throughput of the network traffic data flow. For example, a PCI-Express-based interface (e.g., the network interface 130) allows for greater throughput than a standard PCI or other interface available through the PCH 118. Thus, in high network throughput requirement systems, the NIC 132 may be coupled to the CPU 102 in a fashion similar to the one that is shown in FIG. 1. In lower network throughput requirement systems, the NIC 132 may be coupled to the CPU through the PCH 118 (this configuration is not shown).

In many embodiments, computer system 100 includes hardware and software logic capable of providing a virtualized environment with one or more guest operating systems (OSs) running in virtual machine (VM) environments. A virtual machine monitor (VMM) 136 or hypervisor may be implemented in logic within the system to isolate each VM's operating environment. The isolation causes each VM and any OS and applications running within the VM's environment to be unaware of other VMs present in the system. To achieve this isolation, the VMM 136 virtualizes the CPU, memory, and I/O resources observed by an OS in the VM. The VMM 136 may reserve a portion of system memory 116 for each VM present in the system. For example, VM 138 and VM 140 each may include a portion of dedicated memory space. In other embodiments, each VM may be allocated a portion of system memory on demand the first time when a memory access takes place from the VM. In the embodiment shown, OS 142 is running utilizing the resources of VM 138. CPU 102 may be shared among the present VMs in a time-shared fashion. Each VM is granted slots of processor time to perform operations. A scheduler located in VMM 136 will decide when each VM is granted processor time. The VMM 136 controls switching between the contexts of each VM when ownership of CPU 102 changes from one VM to another VM. In FIG. 1, VMM 136, VMs 138 and 140, and OS 142 comprise software running on the hardware represented as hardware computer system 100 directly below the software block representations.

In this virtualized environment, it is important to virtualize the I/O devices present in the system. Virtualized I/O allows multiple VMs to share a single I/O device. In some embodiments, I/O sharing could be implemented in software. The VMM can intercept all I/O device access requests from VMs present in the computer system and then forward the requests to a device model, corresponding to the I/O device, running in the VMM. The device model may then send actual I/O requests to the shared I/O device on behalf of each VM that sent in an I/P device access request.

In these embodiments the VMM is the only entity accessing the I/O device by aggregating all virtual I/O requests from the VMs. This model works on current computer systems without any additional hardware required, but there may be a performance drop for an I/O device access in a VM due to a long software execution path and frequent context switching between VMs to share the device.

In other embodiments, the shared I/O device may be implemented in a virtualization-friendly manner to allow performance-guaranteed sharing among all VMs in the computer system 100. In these embodiments, the I/O device itself is partitioned into multiple functional units, each of these units is capable of servicing I/O requests in parallel with the other units. To enable this I/O access environment, an I/O virtualization remap engine 144 may be present in the computer system 100 to assist the VM with directly accessing one of the functions (e.g., functional units) on the shared I/O device. In some embodiments, this engine includes Intel® Virtualization for Directed I/O technology or VT-d. In other embodiments, another hardware assisting logic is utilized. The IOV remap engine 144 may include generalized I/O memory management unit (IOMMU) technology. This technology enables software to create multiple DMA protection domains and assign an I/O device, or a functional unit within an I/O device, to each domain. The IOV remap engine 144 includes multi-level page table structures for DMA address translation per I/O device. Additionally, the IOV remap engine 144 also may support remapping interrupts received from I/O devices into message signaled interrupts (MSIs). Remapping DMA transactions and interrupts enable multiple VMs to interface with the same I/O devices. A DMA address translation structure and an interrupt remapping table may be implemented to allow a VM to have direct access to a set of real I/O resources without incurring heavy software virtualization overhead.

Each VM operating in the computer system 100 may communicate over the network 134 with one or more remote entities (such as remote servers or other such remote computer systems). Incoming network packets originating from remote systems may be received by the NIC 132 to be routed into the computer system to a targeted VM. Outgoing network packets originating from one of the VMs in the computer system are sent to the NIC 132 which routes the packets to one or more remote systems across the network 134. Each network packet may be composed differently in different implementations, but generally each packet at least has a header that includes information such as the target address as well as a payload that includes the data being transported in the packet. For example, an Internet Protocol (IP) header may contain an IPv4 address (such as 10.239.0.1), an Ethernet header may contain a MAC address (such as 00-00-00-07-AC-OD), among other types of possible addresses.

In some embodiments, the NIC 132 may support parallel accesses from multiple software entities (such as VMs). To isolate each VM for separate communication, the NIC 132 may include several virtual functions (VFs), each of which may correspond to a certain VM or VMM, and could handle the receipt and transmission of packets independently. For example VF 146 may correspond to VMM 136, VF 148 may correspond to VM 138, and VF 150 may correspond to VM 140. Remote entities may not have knowledge of the individual virtual functions, thus arbitrator logic 152 may be present within the NIC 132 to receive incoming network packets from the network 134 and route them to the correct virtual function. In many embodiments, the arbitrator 152 can distinguish target addresses within incoming network packets to know which virtual function the packets are targeting. The relationship between a virtual function and a VM may be setup by the VMM 136. An administrator may configure these attributes. For example, the VMM 136 may bind an IP address and a MAC address corresponding to one VM to the virtual function to which that VM is bound. A given target network address may be designated as an address for VM 138. Thus, when the incoming network packet is targeting that particular network address, the arbitrator knows to send the packet to VF 148 for processing. In different embodiments, the NIC 132 may be a Single Root I/O Virtualization (SR-IOV)-capable device, a Virtual Machine Device Queue (VMDq)-capable device, or another type of NIC device that has virtualization capabilities.

Each virtual function within the NIC 132 includes a queue pair (QP) that provides a queue for incoming packets to the computer system 100 and a queue for outgoing packets to the network 134. Additionally, each virtual function within the NIC 132 may include packet filtering logic. For example, a simple filtering agent (SFA) may be included as a portion of logic within each VF. SFAs 154, 156, and 158 may reside within VFs 146, 148, and 150, respectively. A SFA is capable of enforcing certain filtering rules. In general, embodiments of the SFAs do not include a full set of simple as well as complex filtering rules because the SFA are generally considered to be within a performance critical path. In other words, the network packets may be incoming or outgoing at a fast rate for each VF and complex filtering mechanisms that have the capability to filter all types of network packets have complexity that adds latency to the filtering process.

With many simple network packets, complex filtering rules are never utilized because the packet is simple and straightforward. Some examples of simple filtering rules that may adequately filter packets with no complex filtering requirements may check the source and destination IP (Internet Protocol) address, the TCP/UDP (Transmission Control Protocol/User Datagram Protocol) ports, and possibly check additional simple information related to a given packet. These simple filtering functions generally only require packet header verification. Packet header verification-based filtering may be implemented in the logic within each SFA. For example, a simple rule for web servers may allow incoming packets from any source IP address if target port is 80, while blocking all packets destined for ports other than 80. Packets that can be verified easily through the header information or through other simple requirements can be allowed through a given SFA filter and sent on to the targeted VM directly. In some embodiments, a SFA filter may be implemented using general policies rather than looking at individual bits within a packet. The SFA filter may implement a "permit" policy that allows all traffic targeting a specific virtual function to pass. The permit policy may be implemented in circumstances where security is not a concern such as in an intranet within an organization where traffic within the organization is assumed secure. On the other hand, a "deny" policy always blocks any traffic which may be routed through a side band channel for further filtering.

Some packets may require complex filtering rules. If a packet reaches an SFA and the simple filtering rules cannot adequately determine if the packet should be allowed to be routed to its final destination, the SFA in question may forward the packet to a Sideband Filtering Agent (SBFA)

160. The SBFA 160 may take the packet and route it to the VF owned by the VMM 136 (specifically VF 146). SFA 154, within VF 146, may be aware of the forwarding issue (complex filtering rules required) and allow the packet to pass through its filter. For example, a flag may be set in the packet header by the forwarding SFA to indicate the packet needs to be filtered in a complex manner. Thus, once SFA 154 knows this, it may forward the packet (or have other logic within VF 146 forward the packet) to a Virtual Ethernet Bridge (VEB) 162 active within the VMM 136. The VEB 162 includes logic to enforce complex filtering rules.

Any filtering rule that is not considered simple and capable of remaining in the high-performance path of the SFA (i.e., to eliminate additional filtering latency) would be considered complex and contained within the VEB 162. For example, some filtering rules require deep network packet inspection. This type of inspection can scan or even modify the data payload of the packet apart from the package header. One complex rule may scan the entire packet to search for virus patterns, and then block adverse traffic. Another complex rule may implement a version of network address translation (NAT) to hide internal VMs from external networks. Hiding the VMs from external networks may be accomplished by modifying the source IP or even source TCP/UDP port in the packet. This type of modification may require recalculating the checksum value of the data payload.

These types of complex filtering requirements for certain types of packets may require a large amount of built in logic within the filter. This logic may be costly in terms of memory space or die area within the NIC. It's likely the number of filtering rules would be constrained due to the limitations of the NIC as well. So other than a performance issue, implementing complex rules in the SFA may cause a storage space problem. Also, some filtering rules may change frequently in certain system implementations. These types of rules that change may not be good candidates to put in an SFA, especially in embodiments where the SFA logic is implemented primarily in hardware circuitry for speed.

These complex filtering rules can be implemented in software within the VEB 162. They can be updated and modified at any given time, and they don't stand in the way of the critical performance path for high-speed packet throughput. Thus, a bifurcated approach that implements cooperated packet filtering both within the SFAs per VF as well as in the VEB running in the VMM is disclosed.

In other embodiments that are not shown, the VEB 162 may be implemented in a special VM dedicated to the VEB 162 functionality rather than implemented in the VMM 136.

Figure 2:
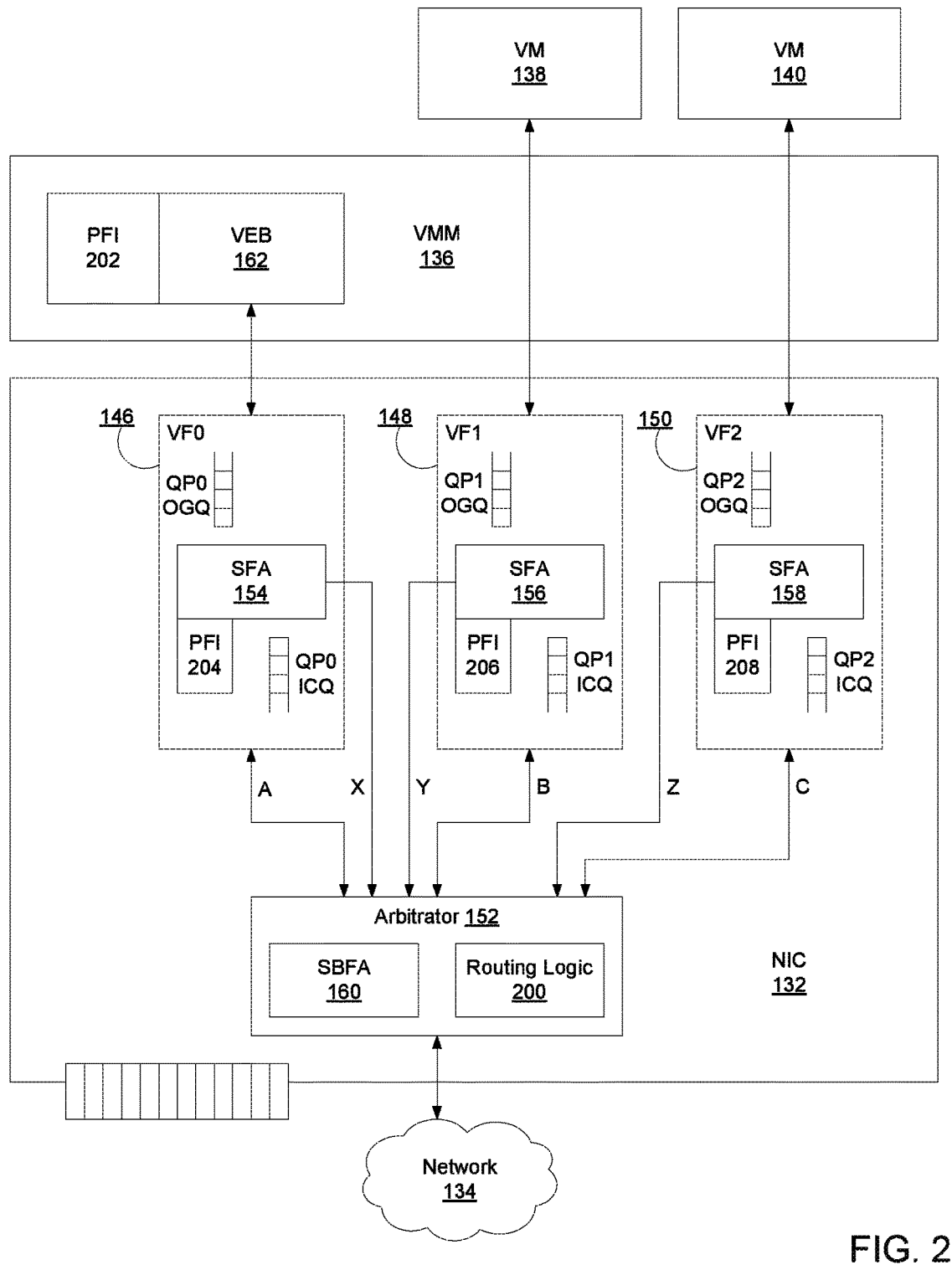
FIG. 2 illustrates an embodiment of the detailed NIC and VMM components of a cooperated packet filtering device and system.

FIG. 2 illustrates an embodiment of the detailed NIC and VMM components of a cooperated packet filtering device and system.

The NIC 132 from FIG. 1 is shown. Within NIC 132 there are three virtual functions, VF0 146, VF1 148 and VF2 150. These are owned by VMM 136, VM 138, and VM 140, respectively. This VF to VMM/VM mapping was also shown in FIG. 1, as was the SFA logic enclosed within each VF (SFA 154, SFA 156, and SFA 158). In many embodiments, VMM 136 sets up the mapping between each VF and VMM/VM. This setup process may include programming the IOV remap engine 144 to allow a VM direct access to a granted VF. FIG. 2 specifically shows the queue pair for each VF. Queue pair 0 (QP0) includes an outgoing queue (OGQ) that queues packets arriving from the VMM 136 as well as an incoming queue that queues packets arriving from the network 134 via the arbitrator 152. Queue pair 1 (QP1) includes an outgoing queue (OGQ) that queues packets arriving from the VM 138 as well as an incoming queue that queues packets arriving from the network 134 via the arbitrator 152. And Queue pair 2 (QP2) includes an outgoing queue (OGQ) that queues packets arriving from the VMM 140 as well as an incoming queue that queues packets arriving from the network 134 via the arbitrator 152. In different embodiments, more or less VFs may be present.

There is no direct relationship between a given VF number and a given VM number. The VF number is implemented by the NIC vendor while the VM number is managed by a system administrator. It is possible that the number of available VFs is less than the number of existing VMs. In this situation, a system administrator may decide the binding between the VFs and the VMs based on service policies (e.g., a Service Level Agreement). To remedy this issue, there may be a subset of VMs that are bound to VFs while the rest of the VMs are required to go through software VEB filtering exclusively.

The aforementioned arbitrator 152 includes routing logic 200 that can determine the location a packet is targeting based on packet header information. Whether that packet header information includes a MAC address, an IP address, a port number, or other simple target address information, the routing logic 200 reads the data in a given packet, and then forwards it on to the originally intended recipient. If that is to a VF, then the arbitrator 152 may forward along internal path A, B, or C within the NIC 132 (which results in the packet arriving at VF0 146, VF1 148, or VF2 150, respectively. On the other hand, if the arbitrator 152 is receiving the packet from a VF, the packet may be bound for the network 134, in which case the routing logic 200 passes the packet to the network.

Additionally, the arbitrator 152 also may receive a packet from a VF because it was forwarded by an SFA due to a complex filtering requirement. In this case, the Arbitrator 152 receives the packet through internal paths X, Y, or Z. The arbitrator routing logic 200 realizes the alternative path it receives the packet from and sends the packet to the SBFA 160 logic. The SBFA 160 forwards the packet through internal path A to VF0 146. In many embodiments, VF0 146 owned by VMM 136 is placed in a "promiscuous" mode. Promiscuous mode allows passing all receiving traffic through even when that virtual function is not the destination of the traffic. In this mode, VF0 routes the packet from SBFA 160 to VEB 162 within VMM 136. VEB 162 can then handle the complex packet filtering and route the packet back accordingly after having completed the complex filtering. Otherwise the packet may be discarded.

After passing through complex filtering, VEB 162 routes the packet back through VF0 146. Some fields in the packet may be changed according to the designated filtering rules, but the destination addresses are kept through each filtering process. This allows the arbitrator 152 to route the packet to the correct virtual function after receiving filtered traffic from VF0 146, which ensures the VM is receiving a network interrupt from the desired virtual function. In these cases, the destination SFA is capable of differentiating a packet previously rerouted through the SBFA 160 from a new packet coming in from the network the first time. Differentiating between these different types of packets is crucial to avoid blocking packets that have already passed a VMM-VEB check. In some embodiments, the SFA may record packet header information prior to forwarding a packet to the SBFA 160. This information may include a source/destination IP address, a source/destination port number, etc. This information may be enough to differentiate the a packet from those which have been previously handled by VMM-VEB and re-routed back. In any of these embodiments, information either stored in the packet or locally by the SFA to differentiate new packets from previously filtered packets allows the SFA to know not to block the packet a second time In some embodiments, the packet header may include stage information such as new, forwarded, return-back, etc.

In other embodiments not shown in FIG. 2, the A and X internal paths, B and Y internal paths, and C and Z internal paths are the same path so only one path is shown between each VF and the arbitrator 152. In these embodiments, the SFA would need to modify at least one flag or piece of data in the packet header, or to prepend its own internal header to the original packet, to indicate to the Arbitrator 152 the nature of the packet (i.e., that the packet was forwarded for complex filtering). With this embodiment, VF0 146 may include some simple filtering capabilities that allow the SFA to not require a promiscuous mode for receiving packets from the SBFA 160 that have other VFs as the destination. Though, this alternative embodiment potentially impacts network critical performance path traffic. Thus, it is beneficial to have internal paths X, Y, and Z separate from internal paths A, B, and C, respectively, to eliminate any unnecessary overhead on the A, B, and C critical performance paths.

Additionally, SFA 154 is present in VF0 146 because there's no hard requirement to always have VF0 146 owned by VMM 136. Any VF can be owned by the VMM 136 depending on how a system administrator configures the computer system. When VF0 146 is used by the VMM 136, some simple filtering rules may be enforced that would not allow a given packet to reach the VEB 162 even if that was the target. For example, bad packets such as those with CRC errors, size errors, etc. may be dropped using simple filtering rules from any SFA, including SFA 154.

In many embodiments, a packet filtering interface (PFI) is present at each filter. For example, PFI 202 interfaces with VEB 162, PFI 204 interfaces with SFA 154, PFI 206 interfaces with SFA 156, and PFI 208 interfaces with SFA 158. Each PFI allows administrator access to configure packet filtering rules. Configuring each filter to customize the filtering rules allows for greater flexibility and is generally desired at least for the VEB 162, since that enforces the complex rules, the rule exceptions, and newer rules that might have been implemented since the SFA logic was implemented. Though, in some embodiments that are not shown, a PFI is only coupled to the VEB 162 and not the SFAs. In many embodiments, PFI 202 interfaces with VEB 162 using the same interface definition as other PFIs interface with the SFAs. This may allow a simplification by standardizing the interface to any filter in the system. In other embodiments, the VEB PFI and SFA PFIs could have different interface definitions.

The same filtering technique for network packets being received from the network 134 by the NIC 132 also may apply to network packets originating from a VM and targeting a remote system on network 134. For example, an application running within VM 140 may send a packet targeting a remote server on the Internet, but there may be security protocols in place to not allow the direct sending of packets from computer system (100 in FIG. 1) to the Internet. Thus, a security SFA filter may initially block the packet and forward it to the VEB 162 for complex security filtering to determine if the packet is permitted to leave the computer system. A highly classified computer that disallows sending images within packets might be an example of a security protocol. The SFA can block every packet targeting a remote system and the VEB 162 may then receive the blocked packets and scan them for image data. The VEB 162 may drop the packet and not allow it to continue on to the intended target if image data is found in the packet.

Figure 3:
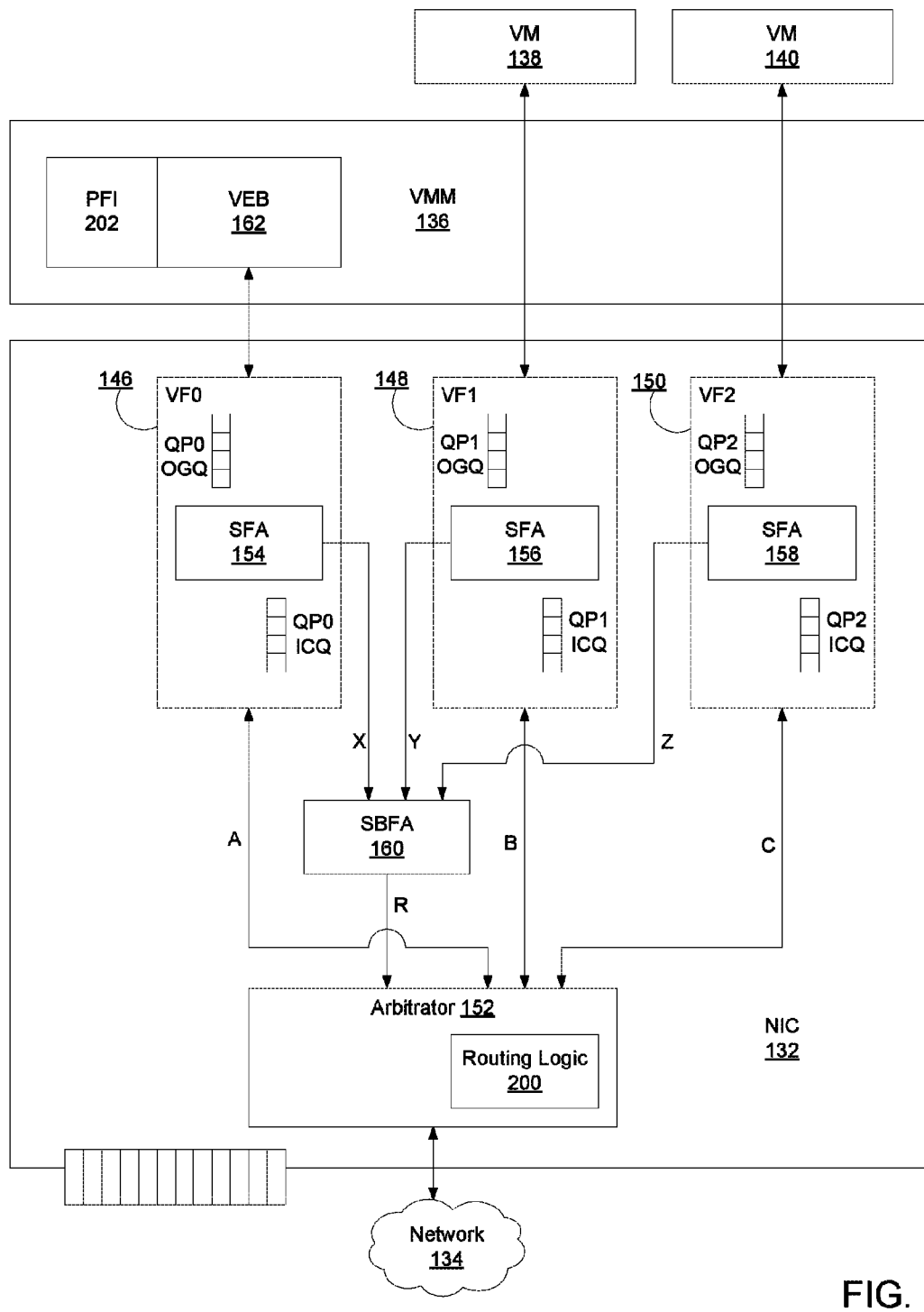
FIG. 3 illustrates another embodiment of the detailed NIC and VMM components of a cooperated packet filtering device and system.

FIG. 3 illustrates another embodiment of the detailed NIC and VMM components of a cooperated packet filtering device and system.

The functionality of the components in FIG. 3 is the same or similar to those same components that were discussed in FIG. 1 and FIG. 2. FIG. 3 specifically is shown for a different internal configuration of the NIC 132 from FIG. 2.

Notably, the SBFA 160 is removed from within the arbitrator 152 and now is a separate component within the NIC 132. The arbitrator 152 may send a packet received from the network 134 to VF1 148 across internal path B. An SFA 156 filter blocks the packet and forwards it to the SBFA 160 across internal path Y. The SBFA 160 then takes the forwarded packet, modifies the header to indicate the packet needs complex filtering by the VEB 162 and then sends it back to the arbitrator 152 along internal path R. Either by just receiving a packet from internal path R or by checking the header for a complex filtering request (such as a flag), the routing logic 200 within the arbitrator 152 then realizes the packet is designated to be sent to the VEB 162 and sends the packet to the VEB 162 through VF0 146 along internal path A. SFA 154 allows the packet through for complex filtering processing by the VEB 162 as long as the modified packet does not have a basic problem, such as a CRC error (in which case SFA 154 would block the packet from being received by the VEB 162 in VMM 136). Once the packet is received by the VEB 162 for processing, the filtering is completed.

As mentioned, the FIG. 3 configuration removes the SBFA 160 logic from the arbitrator 152, but still requires the packets reaching the SBFA 160 to be routed back through the arbitrator 152 to reach the VEB 162.

In other embodiments that are not shown, SFA 154 includes additional logic (not shown) that allows packets that have just entered the system from the network 134 that are initially designated as complex filtering packets by SFA 154 to be directly passed on to the VEB 162 instead of travelling back to the SBFA 160 via internal path X.

Figure 4:
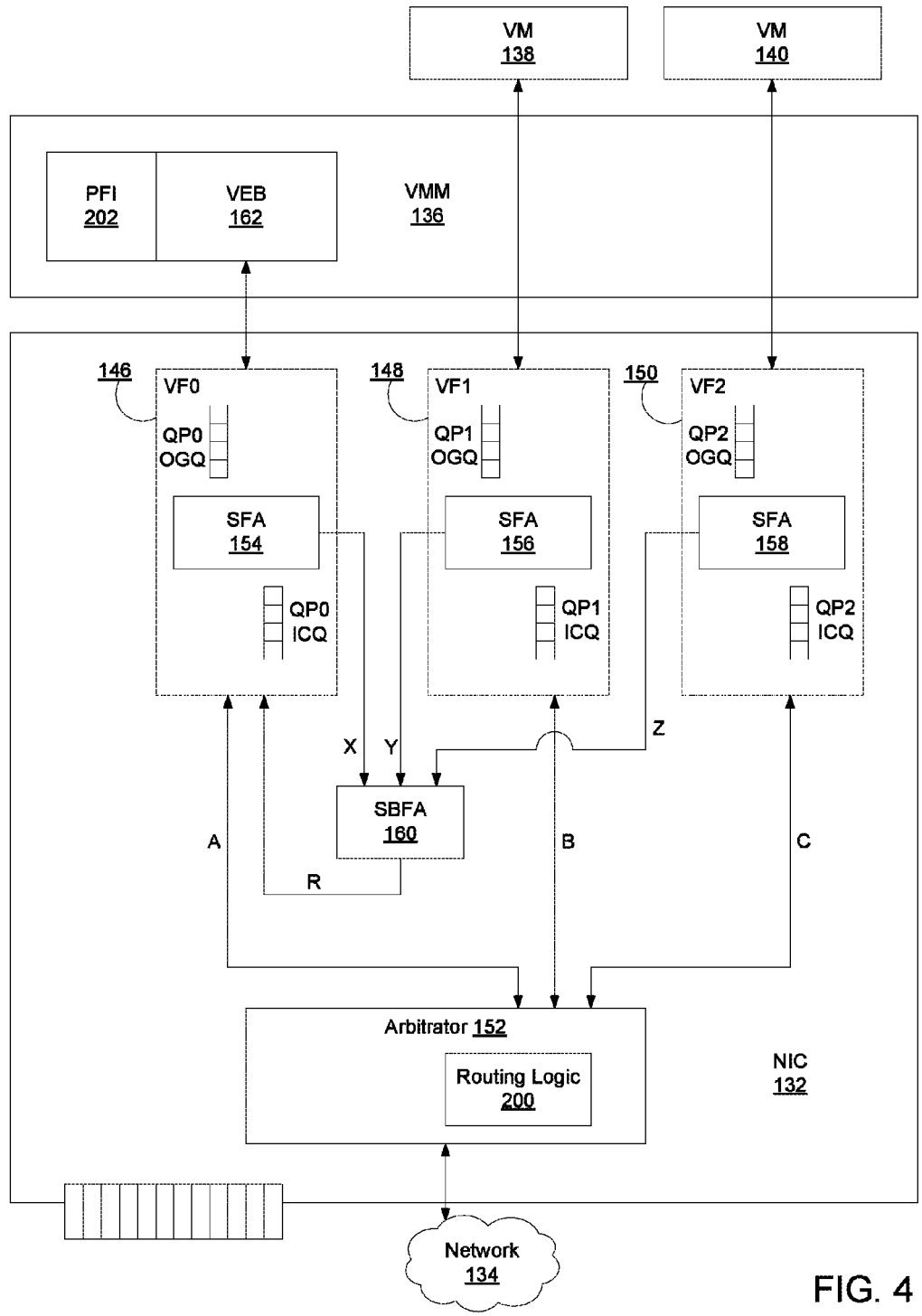
FIG. 4 illustrates yet another embodiment of the detailed NIC and VMM components of a cooperated packet filtering device and system.

FIG. 4 illustrates yet another embodiment of the detailed NIC and VMM components of a cooperated packet filtering device and system.

The functionality of the components in FIG. 4 is the same or similar to those same components that were discussed in FIG. 1, FIG. 2, and FIG. 3. FIG. 4 specifically is shown for a different internal configuration of the NIC 132 from FIG. 2 and FIG. 3.

Notably, the SBFA 160 is not only removed from within the arbitrator 152 and now is a separate component within the NIC 132. But an additional dedicated internal path (path R) is added to run directly between the SBFA 160 and VF0 146. Path R allows arbitrator 152 to focus solely on non-filtered packets. No rerouting is required over to VF0 146 to reach the VEB 162 because in the embodiment shown in FIG. 3, the SBFA 160 routes the complex filtering designated packets directly to VF0 146 and on to the VEB 162 without having the packets routed back through the arbitrator. This configuration may also cause some critical speed path benefits because the arbitrator 152 can limit itself to its original job and not deal with any rerouted/forwarded packets.

In many other embodiments that are not shown, there may be additional SBFAs. As shown in FIG. 1-4, the SBFA is a global unit for the NIC 132, yet in other embodiments that are not shown each SFA may be equipped with its own SBFA channel and device. Thus there might be a 1:1 mapping of SFAs and SBFAs. In yet other embodiments, an SBFA may service a number of SFAs, but not all of them. For example, if there are four SFAs present, there might be two SBFAs, where each SBFA services two SFAs.

Additionally, there are many embodiments that increase the flexibility of the SFA policies, such as whether and how SFA-blocked packets are routed through the SBFA. For example, each SFA may be implemented with control functionality to turn on or off the SBFA-filtering. Thus, if the functionality is turned off, the SBFA may just silently drop packets received from the particular SFA that turned the functionality off.

Figure 5:
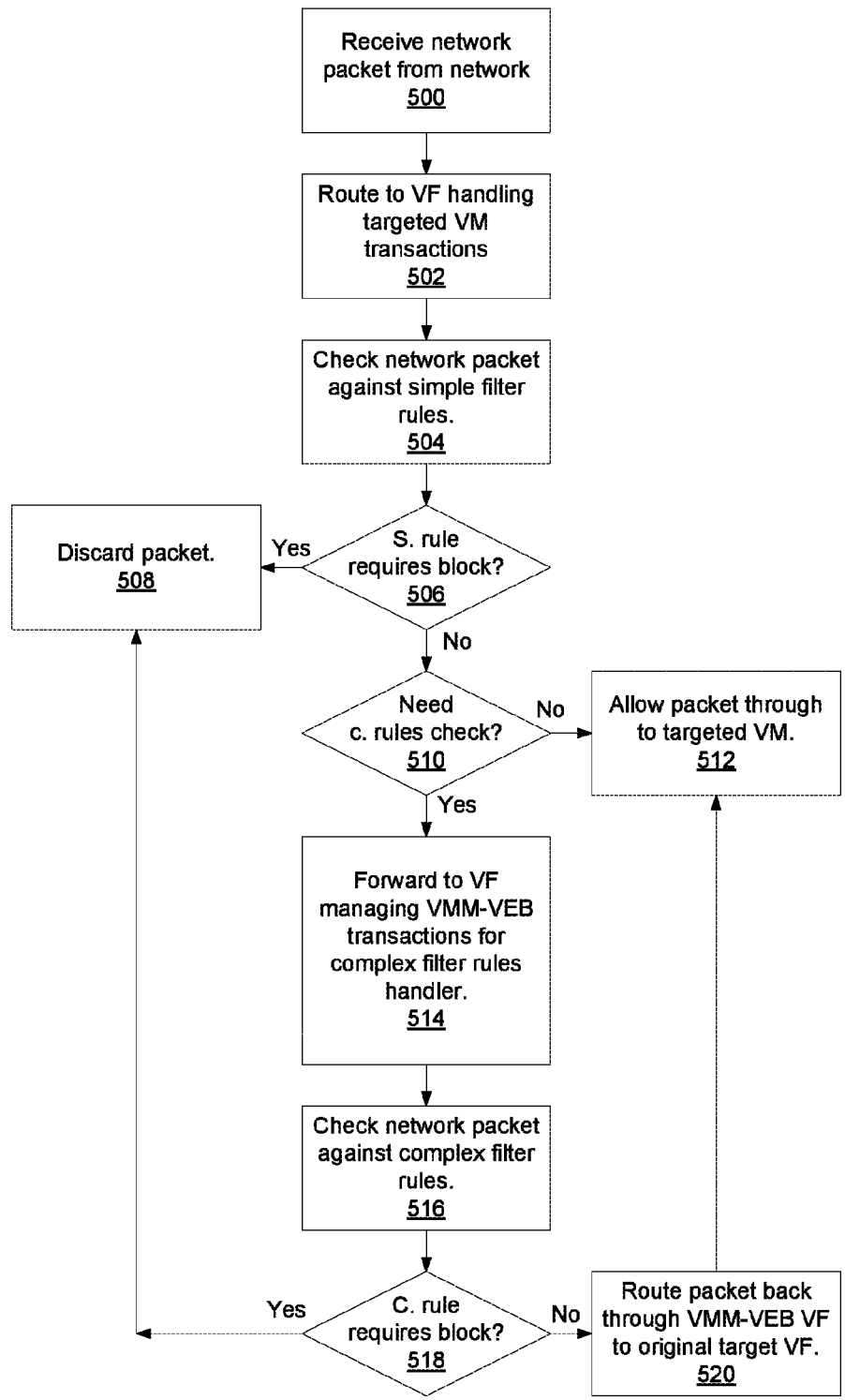
FIG. 5 is a flow diagram of an embodiment of a process to implement cooperated packet filtering of incoming packets from a network.

FIG. 5 is a flow diagram of an embodiment of a process to implement cooperated packet filtering of incoming packets from a network.

The process is performed by processing logic, which may be implemented in hardware circuitry, software programs, firmware code, or a combination of any of the above three forms of logic. The process begins by processing logic receiving a network packet from the network (processing block 500). The packet received from the network has a target address that generally is targeting one of the VMs present in the system and is bound to one of the virtual functions. Processing logic then routes the packet to a virtual function handling transactions for the targeted VM (processing block 502).

Next, processing logic checks the network packet against a set of simple filter rules (processing block 504). At least some of the simple filter rules, in many embodiments, are specifically geared toward information in the header of the packet. Next processing logic determines if any of the simple filter rules checked require the packet as it stands as received to be blocked from reaching the target VM (processing block 506). If there is a block required, the packet may be discarded (processing block 508). If a simple filter rule does not require a block, then processing logic determines whether the packet requires being passed through complex filtering rules (processing block 510).

If there is no complex filtering rules needed, then processing logic will allow the packet through to the targeted VM (processing block 512). If there are any complex filtering rules needed for filtering, then processing logic forwards the packet through the arbitrator/SBFA to the VMM-VEB (processing block 514). VMM-VEB then scans the packet according to configured complex rules (processing block 516). Next processing logic determines if a complex filtering rules requires blocking the packet (processing block 518). If blocked by a complex rule, then processing logic may discard the packet (processing block 508). Otherwise, processing logic in the VMM-VEB routes the packet back through VF0, which then sends the packet back to the originally targeted VF (processing block 520). The SFA in the desired VF then determines this packet was previously forwarded to SBFA and allows the packet through to the targeted VM (processing block 512).

Figure 6:
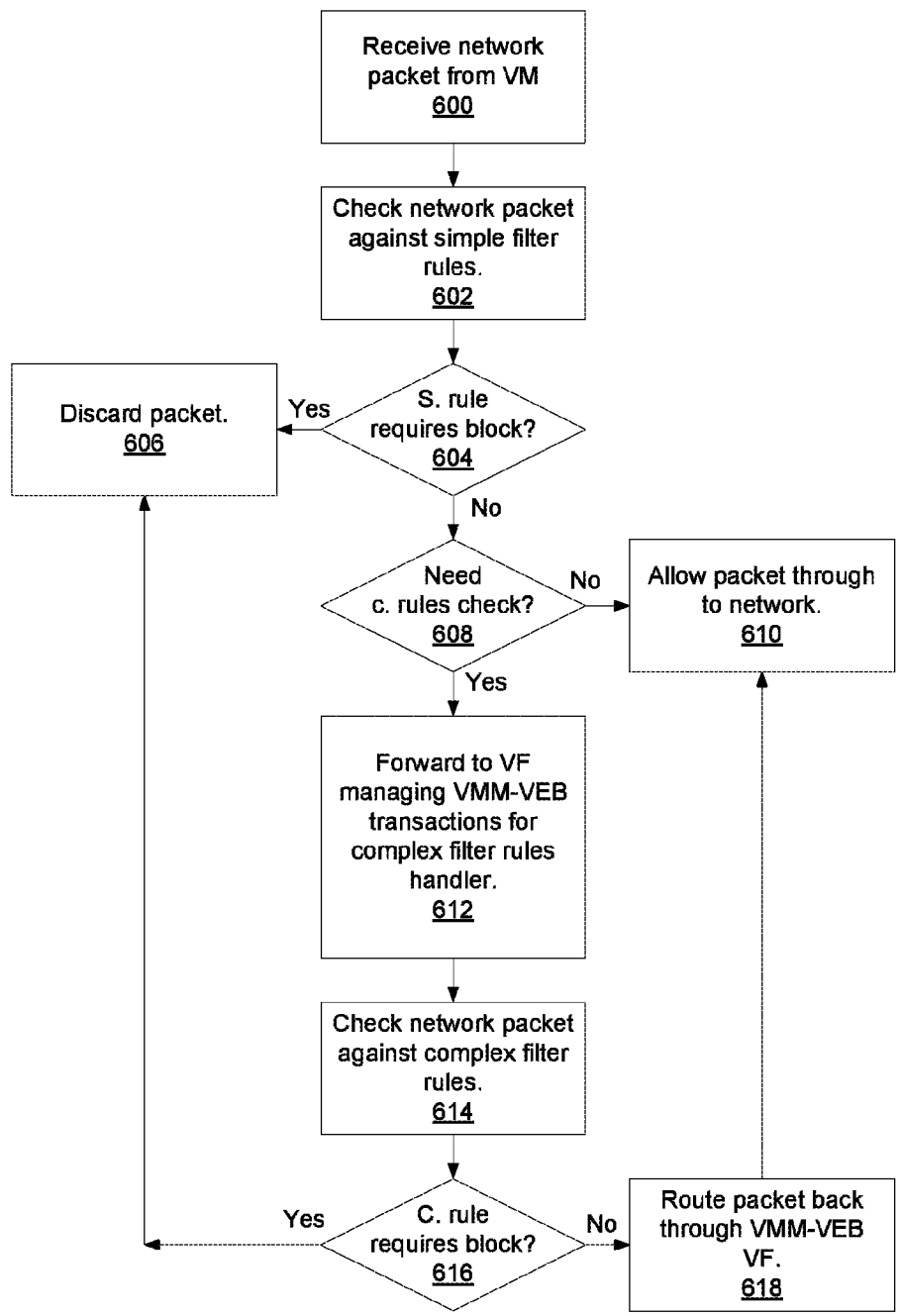
FIG. 6 is a flow diagram of an embodiment of a process to implement cooperated packet filtering of outgoing packets to a network.

FIG. 6 is a flow diagram of an embodiment of a process to implement cooperated packet filtering of outgoing packets to a network.

The process is performed by processing logic, which may be implemented in hardware circuitry, software programs, firmware code, or a combination of any of the above three forms of logic. The process begins by processing logic receiving a network packet from the a VM (processing block 600). The packet received from the VM has a target address that generally is targeting a remote address external to the computer system.

Next, processing logic checks the network packet against a set of simple filter rules (processing block 602). At least some of the simple filter rules, in many embodiments, are specifically geared toward information in the header of the packet. Next processing logic determines if any of the simple filter rules checked require the packet as it stands as received to be blocked from reaching the target VM (processing block 604). If there is a block required, the packet may be discarded (processing block 606). If a simple filter rule does not require a block, then processing logic determines whether the packet requires being passed through complex filtering rules (processing block 608).

If there is no complex filtering rules needed, then processing logic will allow the packet through to the network (processing block 610). If there are any complex filtering rules needed for filtering, then processing logic forwards the packet through the arbitrator/SBFA to the VMM-VEB (processing block 612). VMM-VEB then scans the packet according to configured complex rules (processing block 614). Next processing logic determines if a complex filtering rules requires blocking the packet (processing block 616). If blocked by a complex rule, then processing logic may discard the packet (processing block 606). Otherwise, processing logic in the VMM-VEB routes the packet back through VF0 (processing block 618), which then allows the packet through to the network (processing block 610).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the description above and in the claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The invention claimed is:

1. A network interface apparatus, comprising:
    a first-level matching logic to:
        determine if a first network packet, received from a network, matches under a first-level policy;
        forward the first network packet to a second-level matching logic in a virtual machine monitor (VMM) to enforce a second-level policy on the first network packet, in response to a determination that the first network packet doesn't match under the first-level policy; and,
        forward the first network packet to a virtual machine (VM), in response to a determination that the first network packet matches under the first-level policy.

2. The network interface apparatus of claim 1, wherein the first-level matching logic is further to receive the first network packet from the VMM and forward the first network packet to the VM, if the first network packet matches under the second-level policy.

3. The network interface apparatus of claim 1, wherein the first-level matching logic is further to:
    receive a second network packet from the VM;
    determine if the second network packet matches under the first-level policy;
    forward the second network packet for transmission to the network, in response to a determination that the second network packet matches under the first-level policy; and
    forward the second network packet to the second-level matching logic in the VMM to enforce the second-level policy on the second network packet, in response to a determination that the second network packet doesn't match under the first-level policy.

4. The network interface apparatus of claim 3, wherein the first-level matching logic is further to receive the second network packet from the VMM and forward the second network packet for transmission to the network, if the second network packet matches under the second-level policy.

5. The network interface apparatus of claim 1, wherein the first-level matching logic comprises a virtual function associated with the VM.

6. The network interface apparatus of claim 1, wherein first-level policy comprises a simple filtering rule.

7. The network interface apparatus of claim 1, wherein the second-level policy comprise a complex filtering rule.

8. A system, comprising:
    a processor;
    a system memory;
    a virtual machine monitor (VMM);
    a plurality of virtual machines (VMs);
    a network interface apparatus comprising a first-level matching logic to:
        determine if a first network packet, received from a network, matches under a first-level policy;
        forward the first network packet to a second-level matching logic in the VMM to enforce a second-level policy on the first network packet, in response to a determination that the first network packet doesn't match under the first-level policy; and,
        forward the first network packet to a VM of the plurality of VMs, in response to a determination that the first network packet matches under the first-level policy.

9. The system of claim 8, wherein the first-level matching logic is further to receive the first network packet from the VMM and forward the first network packet to the VM, if the first network packet matches under the second-level policy.

10. The system of claim 8, wherein the first-level matching logic is further to:
    receive a second network packet from the VM;
    determine if the second network packet matches under the first-level policy;
    forward the second network packet for transmission to the network, in response to a determination that the second network packet matches under the first-level policy; and
    forward the second network packet to the second-level matching logic in the VMM to enforce the second-level policy on the second network packet, in response to a determination that the second network packet doesn't match under the first-level policy.

11. The system of claim 10, wherein the first-level matching logic is further to receive the second network packet from the VMM and forward the second network packet for transmission to the network, if the second network packet matches under the second-level policy.

12. The system of claim 8, wherein the first-level matching logic comprises a virtual function associated with the VM.

13. The system of claim 8, wherein first-level policy comprises a simple filtering rule.

14. The system of claim 8, wherein the second-level policy comprises a complex filtering rule.

15. A method to be implemented by a network interface apparatus, comprising:
    receiving a first network packet from a network;
    determining if the first network packet matches under a first-level policy;
    forwarding the first network packet to a virtual machine monitor (VMM) to enforce a second-level policy on the first network packet, in response to a determination that the first network packet doesn't match under the first-level policy; and
    forwarding the first network packet to a virtual machine (VM), in response to a determination that the first network packet matches under the first-level policy.

16. The method of claim 15, further comprising:
    receiving the first network packet from the VMM and forward the first network packet to the VM, if the first network packet matches under the second-level policy.

17. The method of claim 15, further comprising:
    receiving a second network packet from the VM;
    determining if the second network packet matches under the first-level policy;

forwarding the second network packet to the network in response to a determination that the second network packet matches under the first-level policy; and forwarding the second network packet to the VMM to enforce the second-level policy on the second network packet, in response to a determination that the second network packet doesn't match under the first-level policy.

18. The method of claim 17, wherein the first-level matching logic is further to receive the second network packet from the VMM and forward the second network packet for transmission to the network, if the second network packet matches under the second-level policy.

19. The method of claim 15, wherein the first-level matching logic comprises a virtual function associated with the VM.

20. The method of claim 15, wherein first-level policy comprises a simple filtering rule.

21. The method of claim 15, wherein the second-level policy comprises a complex filtering rule.

22. A machine-readable medium having stored thereon instruction, which if executed by a machine causes the machine to perform a method comprising:

receiving a first network packet from a network;

determining if the first network packet matches under a first-level policy;

forwarding the first network packet to a virtual machine monitor (VMM) to enforce a second-level policy on the first network packet, in response to a determination that the first network packet doesn't match under the first-level policy; and forwarding the first network packet to a virtual machine (VM), in response to a determination that the first network packet matches under the first-level policy.

23. The machine-readable medium of claim 22, further comprising:

receiving the first network packet from the VMM and forward the first network packet to the VM, if the first network packet matches under the second-level policy.

24. The machine-readable medium of claim 22, further comprising:

receiving a second network packet from the VM;

determining if the second network packet matches under the first-level policy;

forwarding the second network packet to the network in response to a determination that the second network packet matches under the first-level policy; and forwarding the second network packet to the VMM to enforce the second-level policy on the second network packet, in response to a determination that the second network packet doesn't match under the first-level policy.

25. The machine-readable medium of claim 24, wherein the first-level matching logic is further to receive the second network packet from the VMM and forward the second network packet for transmission to the network, if the second network packet matches under the second-level policy.

26. The machine-readable medium of claim 22, wherein the first-level matching logic comprises a virtual function associated with the VM.

27. The machine-readable medium of claim 22, wherein first-level policy comprises a simple filtering rule.

28. The machine-readable medium of claim 22, wherein the second-level policy comprises a complex filtering rule.

* * * * *

UNITED STATES PATENT AND TRADEMARK OFFICE
CERTIFICATE OF CORRECTION

PATENT NO. : 9,736,116 B2  
APPLICATION NO. : 15/057176  
DATED : August 15, 2017  
INVENTOR(S) : Yaozu Dong and Kun Tian Page 1 of 1

It is certified that error appears in the above-identified patent and that said Letters Patent is hereby corrected as shown below:

On the Title Page

Item (63), replace "Continuation of application No. 13/882,106, filed on Jul. 28, 2014, now Pat. No. 9,276,875" with --Continuation of application No. 13/882,106, filed as application No. PCT/CN2010/001712 on Oct. 28, 2010, now Pat. No. 9,276,875--.

In the Specification

In Column 1, Lines 10-11, replace "which was filed on Jul. 28, 2014 and was issued as U.S. Pat. No. 9,276,875 on Mar. 1, 2016" with --which was filed on Jul. 28, 2014 and was issued as U.S. Pat. No. 9,276,875 on Mar. 1, 2016, and which is a U.S. national stage entry of International Application No. PCT/CN2010/001712, which was filed on October 28, 2010--.

Signed and Sealed this  
Third Day of July, 2018

Andrei Iancu  
*Director of the United States Patent and Trademark Office*